United States Patent
Tang et al.

(10) Patent No.: US 7,466,426 B2
(45) Date of Patent: Dec. 16, 2008

(54) PHASE SHIFTING IMAGING MODULE AND METHOD OF IMAGING

(75) Inventors: Shu-Guo Tang, Blue Bell, PA (US); Kevin George Harding, Niskayuna, NY (US); Robert William Tait, Brighton, MI (US); Craig Alan Cantello, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 219 days.

(21) Appl. No.: 11/300,553

(22) Filed: Dec. 14, 2005

(65) Prior Publication Data

US 2007/0133009 A1    Jun. 14, 2007

(51) Int. Cl.
G01B 9/02 (2006.01)
G01B 11/02 (2006.01)

(52) U.S. Cl. .................... 356/495; 356/512
(58) Field of Classification Search ......... 356/512–514, 356/491, 492, 495, 46, 499, 508–510
See application file for complete search history.

(56) References Cited

U.S. PATENT DOCUMENTS

| | | | | |
|---|---|---|---|---|
| 3,867,035 | A * | 2/1975 | Kaul | 356/499 |
| 5,363,170 | A * | 11/1994 | Muraki | 355/67 |
| 5,392,116 | A | 2/1995 | Makosch | |
| 5,581,345 | A * | 12/1996 | Oki et al. | 356/4.01 |
| 6,084,712 | A | 7/2000 | Harding | 359/618 |
| 6,304,330 | B1 * | 10/2001 | Millerd et al. | 356/521 |
| 6,373,871 | B1 * | 4/2002 | Hemmes et al. | 372/28 |
| 6,496,269 | B2 * | 12/2002 | Mitsutani et al. | 356/512 |
| 6,522,808 | B1 | 2/2003 | Burt et al. | 385/37 |
| 6,847,457 | B2 * | 1/2005 | Tobiason et al. | 356/495 |
| 6,850,329 | B2 * | 2/2005 | Tobiason et al. | 356/495 |
| 7,016,017 | B2 * | 3/2006 | Hansen | 355/67 |
| 7,057,737 | B2 * | 6/2006 | Millerd et al. | 356/495 |
| 7,230,717 | B2 * | 6/2007 | Brock et al. | 356/495 |
| 2001/0007495 | A1 * | 7/2001 | Suzuki et al. | 355/53 |
| 2001/0035961 | A1 | 11/2001 | Mitsutani et al. | |
| 2003/0223075 | A1 * | 12/2003 | Ishizuka et al. | 356/491 |
| 2004/0080736 | A1 * | 4/2004 | Suzuki et al. | 355/53 |

(Continued)

FOREIGN PATENT DOCUMENTS

EP    1746384 A2    1/2007

OTHER PUBLICATIONS

P.K. Tien and R. Ulrich, Theory of Prism-Film Coupler and Thin-Film Light Guides, Oct. 1973, Journal of the Optical Society of America, vol. 60, No. 10, pp. 1325-1337.*

*Primary Examiner*—Michael A Lyons
*Assistant Examiner*—Scott M Richey
(74) *Attorney, Agent, or Firm*—Patrick K. Patnode (57) ABSTRACT

A phase shifting imaging module in a handheld imager is provided. The phase shifting imaging module includes a first beam splitter configured to split an image radiation beam into first and second image radiation beams. It also includes a first prism configured to align the first and second image radiation beams, and a second beam splitter configured to split the first and second image radiation beams into four image radiation beams. A second prism aligns the four image radiation beams. A phase mask introduces phase retardation between the four image radiation beams, resulting in four phase shifted image radiation beams. A pixilated sensor generates image data based upon each of the four phase shifted image radiation beams.

17 Claims, 6 Drawing Sheets

U.S. PATENT DOCUMENTS

| | | | |
|---|---|---|---|
| 2004/0158808 A1* | 8/2004 | Hansen | 716/21 |
| 2005/0018164 A1* | 1/2005 | Hansen | 355/69 |
| 2005/0046863 A1* | 3/2005 | Millerd et al. | 356/495 |
| 2005/0046865 A1* | 3/2005 | Brock et al. | 356/495 |
| 2006/0039007 A1* | 2/2006 | Kim et al. | 356/495 |

* cited by examiner

PHASE SHIFTING IMAGING MODULE AND METHOD OF IMAGING

BACKGROUND

The invention relates generally to an imaging system, and more specifically, to a phase shifting interferometry system used for improved measurements of surface topographies.

Phase shifting interferometry is a method for measuring surface topographies. It is based on a principle of phase shifting and uses wave nature of light to map variations in surface topographies. Phase shifting interferometry is a technique that determines shape of a surface by calculating a phase map from measured light intensities. A phase shifting interferometer typically includes an optical system, an electronic imaging system, a computer based signal processor, and a system for introducing a reference phase shift. This method typically involves electronic storage of light intensity patterns from a test surface measured for a sequence of three to five reference phase shifts. The variations in the light intensity patterns are then analyzed by the computer based signal processor as a function of phase shift to recover a profile of the test surface.

Typically, conventional phase shifting interferometers are capable of measuring a surface topography with a resolution on the order of one-thousandth of the wavelength of light used by the systems. However, when measuring surface topographies for very steep surfaces with a surface depth of the order of 10 μm or less, vibrations occurring in a phase shifting interferometer during a data acquisition cycle can distort measurements being recorded and lead to significant errors.

As a result, such highly precise instruments are typically installed in a fixed location or laboratory. Measurements from large parts or in-process parts on a factory floor or similar location are made indirectly, such as by taking a casting of a part surface, then transporting the casting to the fixed interferometer. The inability to use phase shifting interferometers in more flexible ways has significantly limited their use, and increased the cost and time associated with surface inspection for such large or difficult-to-transport manufactured articles.

Consequently, an improved phase shifting interferometer is needed. In particular, there is a need for a hand held or at least more transportable interferometer with improved image acquisition and image processing capabilities, and that can avoid or resolve errors induced due to the operating environment of the interferometer, particularly those due to vibration.

BRIEF DESCRIPTION

In accordance with one aspect of the invention, a phase shifting imaging module is provided. The phase shifting imaging module comprises a first prism configured to split an image radiation beam into a first and a second image radiation beam. A first beam splitter is configured to align the first and second image radiation beams. A second prism, then, is configured to split the first and second image radiation beams into four radiation beams. A second beam splitter is configured to align the four radiation beams. A phase mask is configured to introduce a phase retardation between the four image radiation beams, resulting in four phase shifted image radiation beams. A pixilated sensor can then generate an image data based upon each of the four phase shifted image radiation beams.

In accordance with another aspect of the invention, a handheld imager is provided. The handheld imager comprises at least one radiation source configured to illuminate a part surface to be tested. At least one lens collimates a radiation beam from the source. At least one polarizer then polarizes the radiation beam. A phase shifting imaging module splits the radiation beam into four phase shifted, aligned radiation beams.

In accordance with another aspect of the invention, a method for measuring a surface feature of a part with a coherent image radiation source is provided. The method includes irradiating a surface with a coherent electromagnetic radiation beam. An image radiation beam is received from the surface. The image radiation beam is split into a first and a second image radiation beam. The first and second image radiation beams are aligned, and then split into four radiation beams. The four radiation beams are then split, and phase shifted with respect to one another. Finally, image data is acquired via a pixilated sensor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present technique provide an imaging system suitable for surface inspection, and based upon the use of a phase shifting imaging module. In a specific example described below, the imaging system is a handheld imager and is a portable device. The handheld imager can be used to measure surface topography of machined parts, and is capable of design for such measurement at sub-micron levels. The technique used herein involves using a single acquired image, splitting it into multiple beams, and introducing phase shift differences amongst the beams. Any disturbances in the original beam due to air, heat or movement will be common in all images and can be constructively eliminated. Thus, in contrast to currently available phase shifting interferometers where multiple images are sequentially acquired and phase shifted, only a single image needs to be acquired, facilitating a very short exposure time, effectively "freezing" of any external vibration effects and making hand-held measurement practical.

Figure 1:
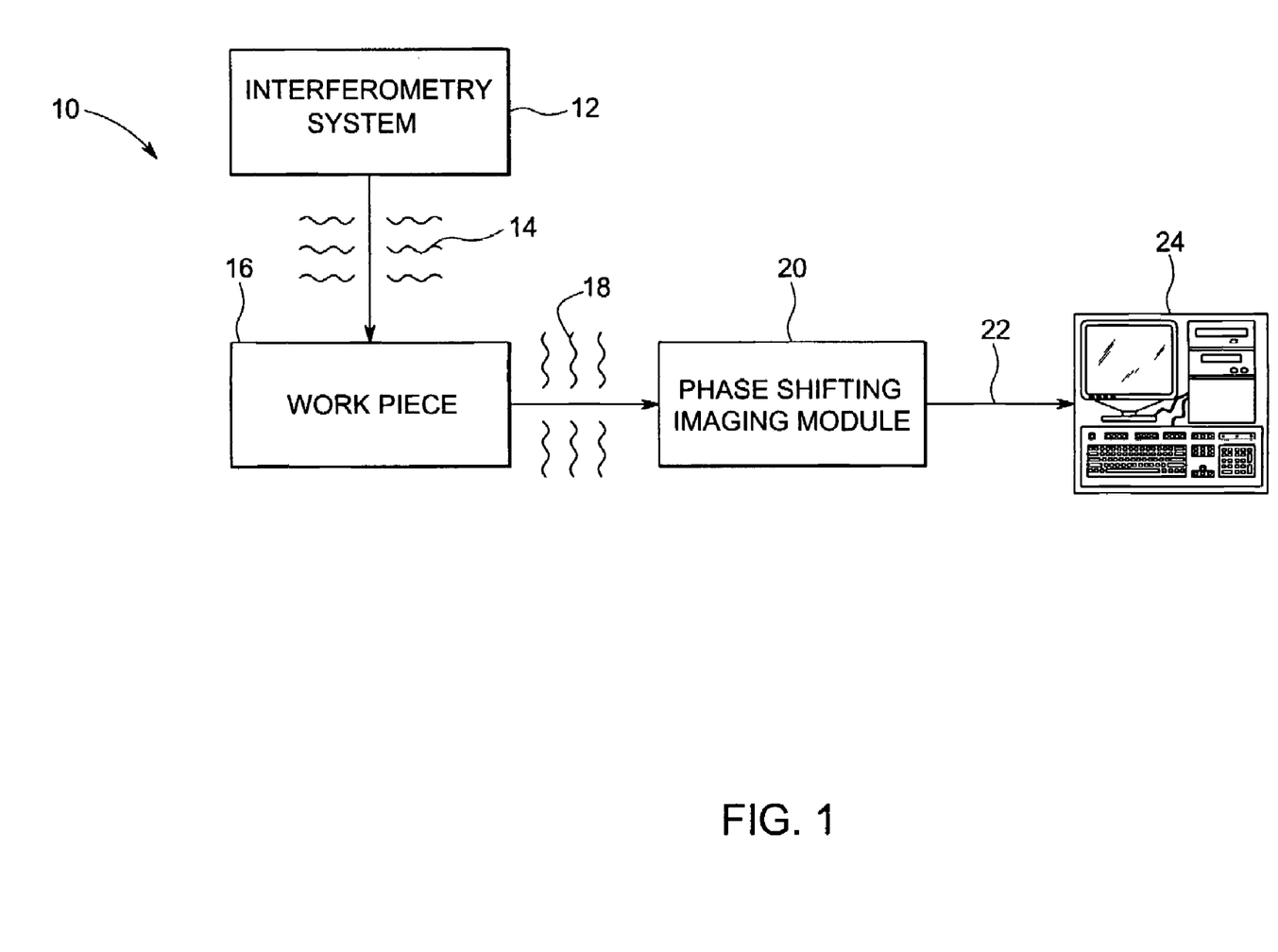
FIG. 1 is a diagrammatic illustration of an imaging system in accordance with one aspect of the invention.

In an exemplary embodiment of the invention as shown in FIG. 1, an imaging system 10 includes an interferometry system 12 designed to direct image radiation 14 towards a work piece 16 whose surface topography is being characterized. The interferometry system 12 comprises at least one radiation source and a plurality of optical components (not shown in FIG. 1) aligned so as to direct a beam of image radiation 14 from the radiation source onto a surface of the workpiece 16 and then to capture the reflected radiation 18 for surface topography measurement. Examples of the radiation source might include a diode laser, although other sources may be employed. Examples of optical components for collecting reflected radiation, as described below, will typically include lenses and prisms, although the particular types of these may vary. In a presently contemplated embodiment described below, a phase shifting imaging module 20 is used to capture the reflected radiation 18 (as described in more detail with reference to FIG. 2 and FIG. 3) from the work piece 16. Measurements of the surface features can them be made based upon the received radiation. Image data 22, then, based upon the reflected radiation 18, representative of the image signals from the work piece 12, is transmitted from the phase shifting imaging module 20 to a workstation 24 that analyzes the signals.

Figure 2:
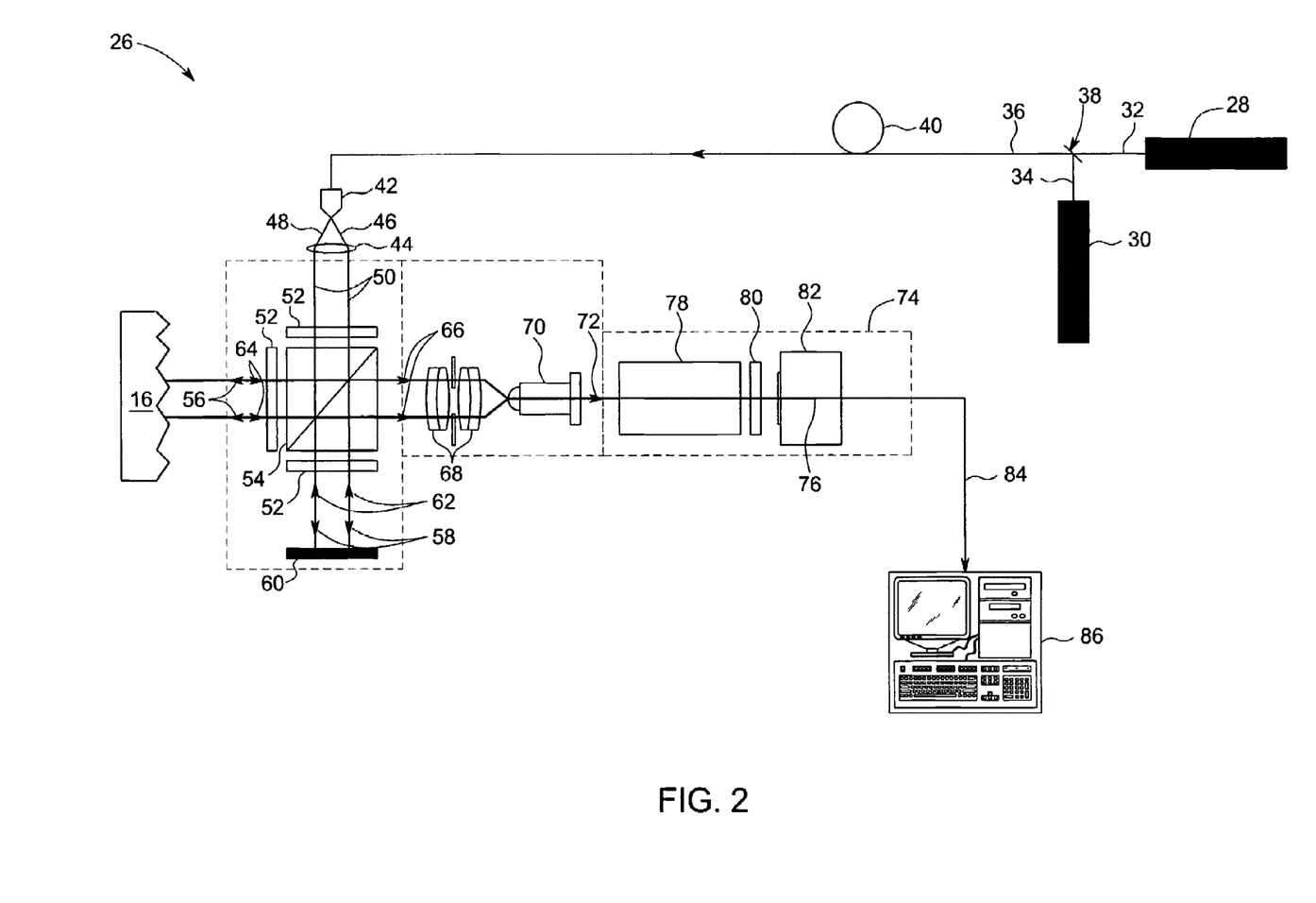
FIG. 2 is a diagrammatic illustration of an imaging system using two radiation sources in accordance with another aspect of the invention.

In one exemplary embodiment of the invention shown in FIG. 2, a hand-held interferometer 26 comprises two radiation sources 28 and 30 emitting respective radiation beams 32 and 34 at different wavelengths. An exemplary imaging system in accordance with the present invention may be configured as a handheld imager as shown in FIG. 2. In the exemplary configuration of FIG. 2, two-wavelength phase shifting interferometry is used. In this technique, an interference pattern of a test surface is obtained at one wavelength $\lambda_1$, and this is repeated at a different wavelength $\lambda_2$. A resultant interference pattern ($\lambda_{eq}$) between the two interference patterns obtained after spatial filtering is equivalent to an interference pattern obtained on the test surface at an equivalent wavelength given by equation 1:

$$\lambda_{eq} = \frac{\lambda_1 \lambda_2}{|\lambda_1 - \lambda_2|} \quad (1)$$

The sensitivity of a measurement can be varied by changing the two wavelengths. In a non-limiting example, if argon ion and helium-neon (He—Ne) lasers are used, the equivalent wavelength can be varied over a range of 2 to 50 μm.

Referring back to FIG. 2, in certain embodiments of the present invention, the radiation sources 28 and 30 include coherent electromagnetic radiation sources such as but not limited to diode lasers. A coherent electromagnetic radiation source is one in which all emitted radiation beams from the source have a constant phase difference with respect to space and time. Radiation beams 32 and 34 from radiation sources 28 and 30, respectively, are combined into a single image radiation beam 36 by a mirror 38 that passes through an optical fiber 40. In a specific embodiment, image radiation beams 32 and 34 comprise a spectral range visible to a human eye. The image radiation beam 36 is coupled by a fiber coupler 42 do produce two concurrent expanding beams 46 and 48, and further collimated by a collimating lens, 44 which is placed at about a focal length distance from the coupler 42, to produce two colinear collimated beams 50. Collimated beams 50 pass through a quarter wave plate 52, and are then incident on a polarizing beam splitter cube 54, which reflects a part of the beams 50 at about right angles (denoted by reference numeral 56) and transmits the remaining part (denoted by reference numeral 58) of the beams 50. Transmitted beams 58 are reflected by a retro reflecting element 60, resulting in a reference radiation beams 62. The retro reflecting element can be a suitable reflecting device, such as a reference mirror.

Beams 56 are incident on the surface of the workpiece 16 whose surface topography is to be characterized. Radiation beams 64 are then reflected from the surface of the workpiece 12. These beams are further incident on a quarter wave plate 52, and the beam splitter cube 54, and are transmitted through the cube. Transmitted beams 66 from the beams splitter cube 54 are then incident on a first set of lenses 68 and further on a second lens 70, which focuses the beams to form a focused beam 72. The resulting focused beam 72 is incident on a phase shifting imaging module 74 that splits the beam into four beams, as indicated by the single line 74 and causes a shift in the phase of the four beams.

The phase shifting imaging module 74, in an exemplary embodiment, includes a quad image splitter 78 to split the radiation beams 72 into four image radiation beams (explained in more detail with reference to FIGS. 3 and 4), a phase mask 80 to introduce phase shifts in images, and a pixilated sensor 82 configured to capture images of the four image radiation beams, and to generate image data, as indicated generally by reference numeral 84. The quad image splitter 78 includes a combination of optical components such that it splits the image radiation beams 72 into four image radiation beams. Suitable optical components for use in such image splitters include prisms and prism films. The phase mask 80 is placed in an image plane to produce 90° phase shifts for each image. Suitable phase masks may include a wave plate, a spatial light modulator, or any other optical element that causes a phase shift in a fringe pattern between two original beams. The pixilated sensor 82 is a device that produces an electrical signal corresponding to the intensity of the four image radiation beams, resulting in an image data 84. For example, the pixilated sensor 82 may include any charge-coupled device, such as a video camera or a high-resolution camera. However, any suitable sensor may be used. The resulting image data 84 captured by the pixilated sensor 82 is analyzed at a workstation 86.

Figure 3:
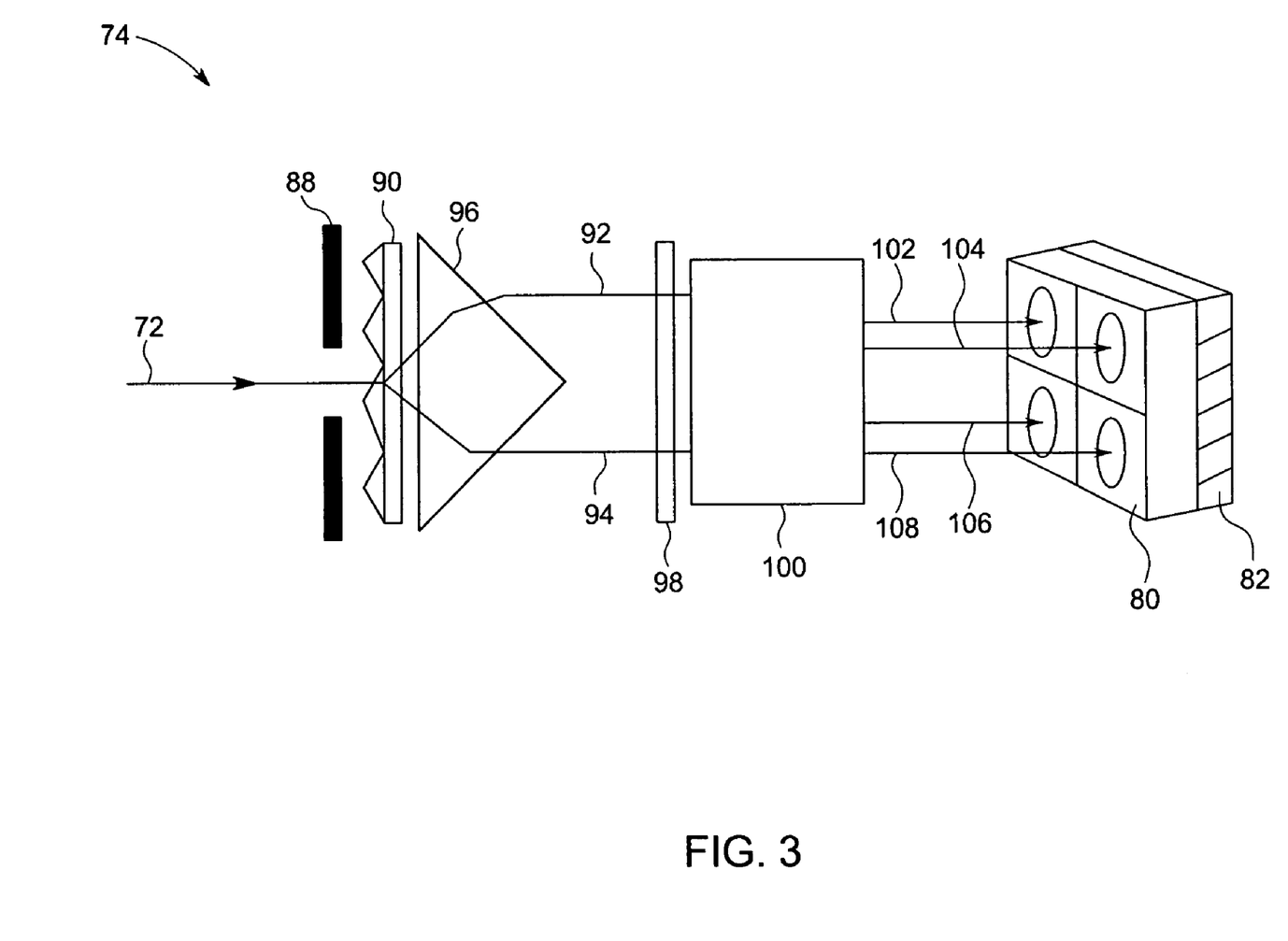
FIG. 3 is a diagrammatic illustration of an exemplary configuration of a phase shifting imaging module using prisms and prism films in accordance with yet another aspect of the invention.

Referring to FIG. 3, an exemplary embodiment of a phase shifting imaging module 74 is illustrated. An image radiation beam 72, as referred to in FIG. 2, incident on the phase shifting imaging module passes through an aperture 88, and then passes through a first beam splitter 90, such as a horizontal prism film. The two radiation beams 92 and 94 then exit the splitter, and are aligned by a first prism 96, such as a right angle prism film. The two radiation beams 92 and 94 are then incident on a second beam splitter 98, such as a vertical prism film, that splits the two beams into four, and then on a second prism 100, such as a right angle prism film, that aligns the four image radiation beams 102, 104, 106 and 108. The four image radiation beams then pass though the phase mask 80, as mentioned above, and image data from all four beams is captured by a pixilated sensor 82.

Figure 4:
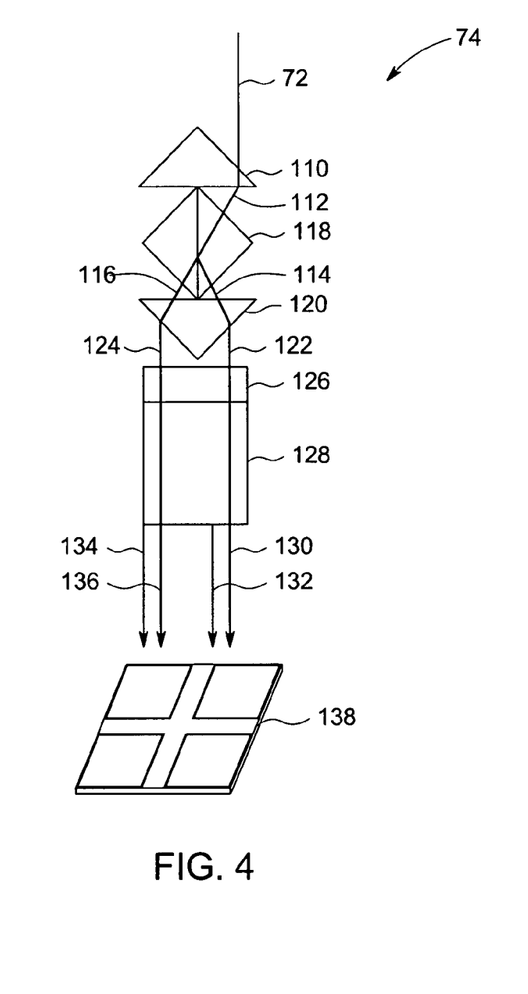
FIG. 4 is a diagrammatic illustration of an exemplary configuration of a phase shifting imaging module using a beam splitter cube in accordance with an aspect of the invention.

Referring to FIG. 4, another exemplary embodiment of a phase shifting imaging module 74 is presented. In this embodiment, an image radiation beam 72, as referred to in FIG. 2, incident on the phase shifting imaging module 74 passes through a right angle prism 110. The redirected beam 112 exiting the prism is split into two image radiation beams 114 and 116 by the beam splitter cube 118. The two radiation beams 114 and 116 are then aligned using a prism 120, such as a right angle prism, resulting in aligned image radiation beams 122 and 124. The image radiation beams 122 and 124 further pass through a second beam splitter 126, and a second prism 128 that split each radiation beam and align the resulting four radiation beams 130, 132, 134 and 136. The four radiation beams then pass through a phase mask and a pixilated sensor system, as indicated generally by the reference numeral 138. The image data is formed and captured in the mask/sensor system.

Figure 5:
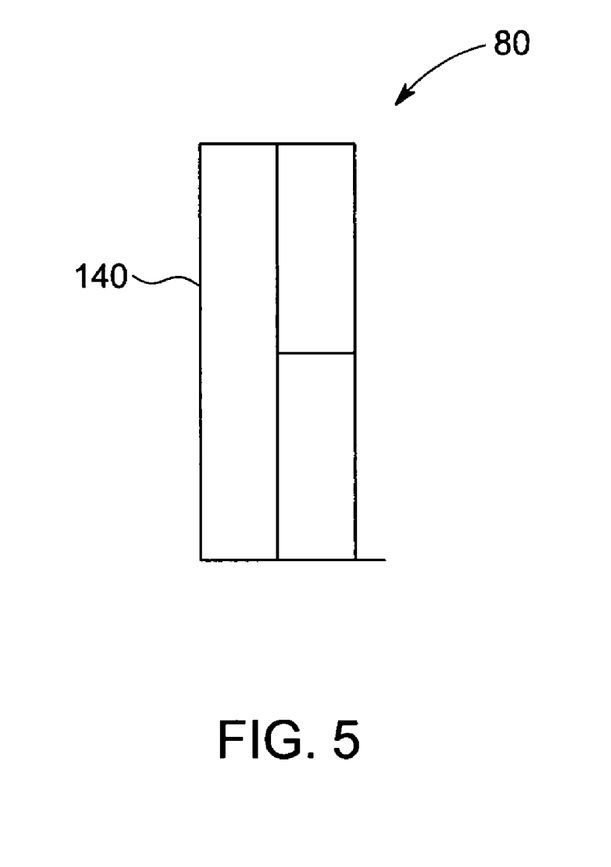
FIG. 5 is a diagrammatic illustration of a phase mask for use in the phase shifting imaging module of FIG. 4 in accordance with an aspect of the invention.

An exemplary phase mask 80 is illustrated diagrammatically in FIG. 5. The phase mask is configured to introduce phase retardation between the four image radiation beams, resulting in four phase shifted image radiation beams. For example, the phase mask may include a quarter wave polarizer 140.

Figure 6:
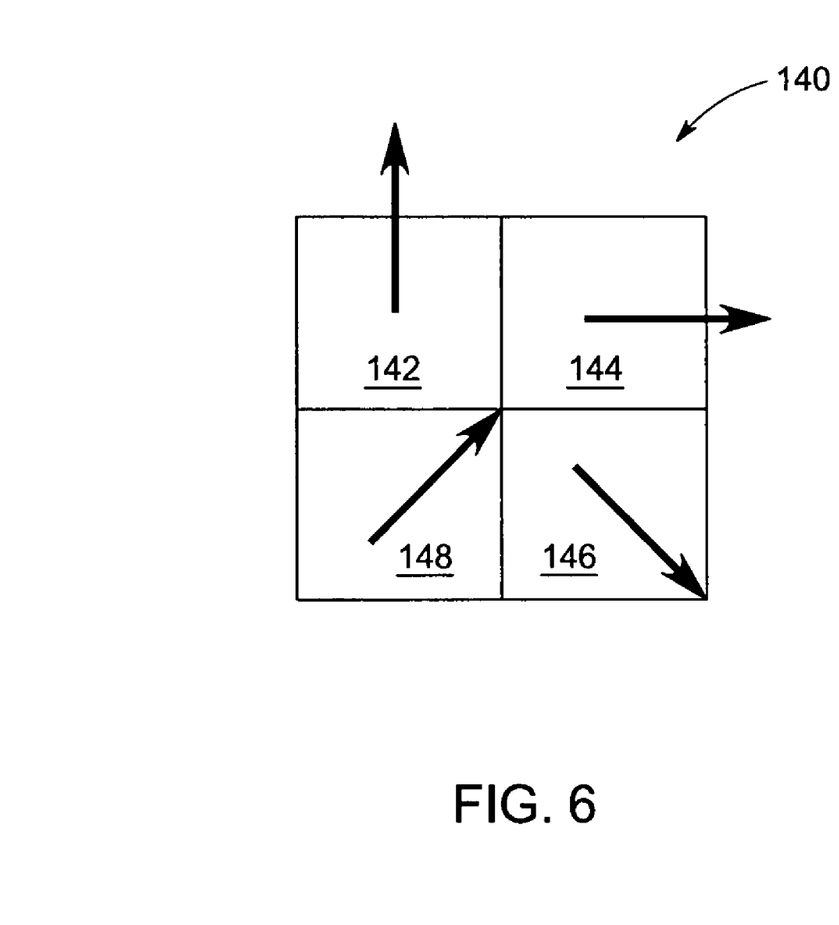
FIG. 6 is a diagrammatic representation of a polarizer design for use in the phase mask of FIG. 5 in accordance with an aspect of the invention.

A representative design of a polarizer 140 including four quarter wave polarizers is illustrated in FIG. 6. The design includes quadrants 142, 144, 146 and 148, each including a quarter wave polarizer capable of phase shifting an incident beam through angles 0°, 90°, 180° and 270° respectively.

Figure 7:
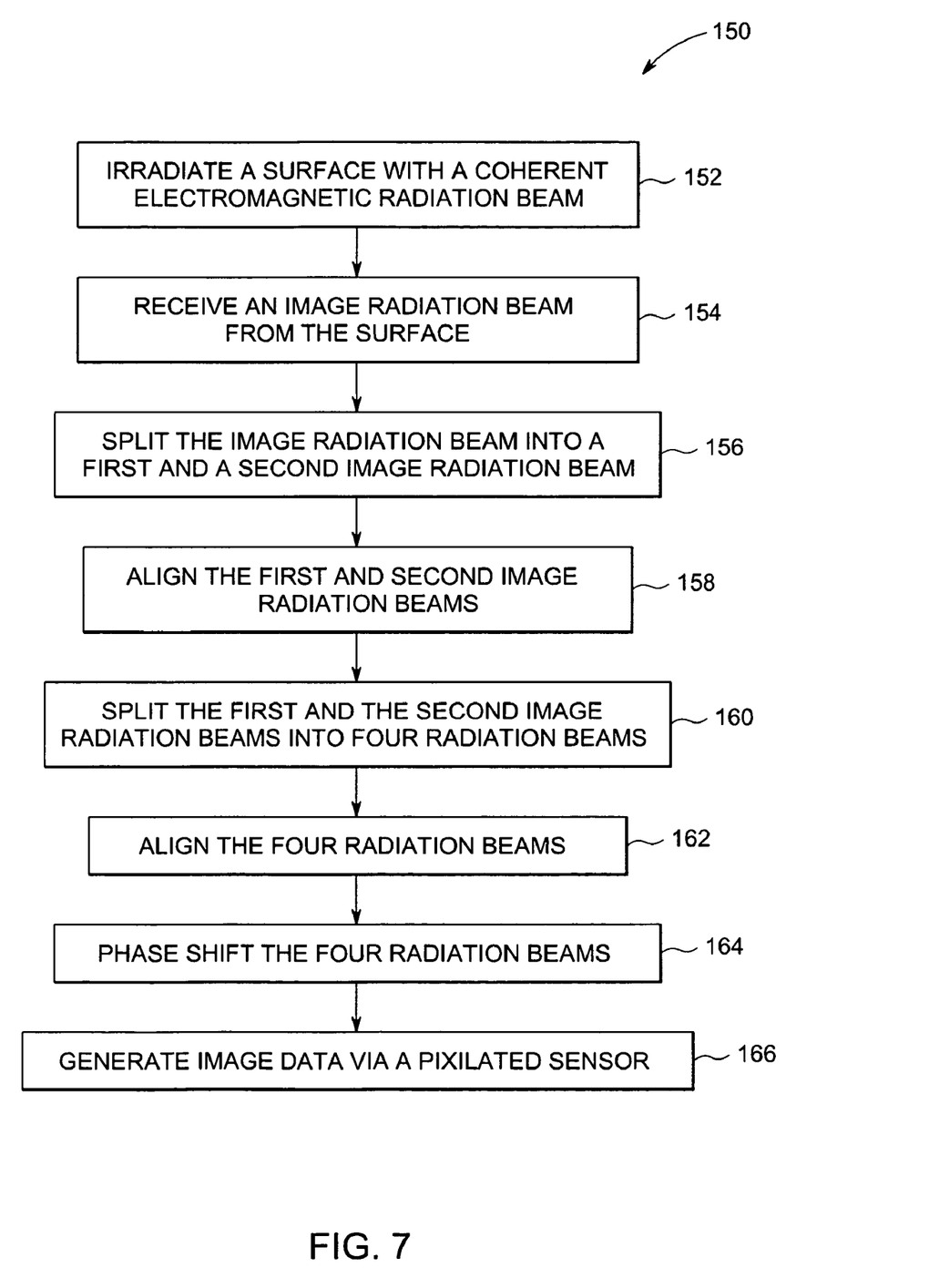
FIG. 7 is a flow chart representation of a method for measuring surface topography of a specimen with an imaging system of FIG. 2.

FIG. 7 is a flow chart illustrating the steps involved in the present method 150 for measuring a surface feature of a part with a coherent image radiation source. The method includes irradiating a surface with a coherent electromagnetic radiation, as indicated at step 152. The radiation beam from the surface of the object being examined is then received, as indicated at step 154. Referring to step 156, the radiation beam is then split into first and second image radiation beams. Further, at step 158, the first and second image radiation beams are aligned. At step 160, the first and second radiation beams, after alignment, are further split into four image radiation beams. At step 162, the four image radiation beams are aligned. The four image radiation beams are then phase shifted, as indicated at step 164, and finally an image data is generated via a pixilated sensor, as indicated at step 166.

The foregoing structures and processes are particularly well suited to part inspection via a handheld device. Specifically, by the use of the components described above, particularly the optical film components, the device can be made quite small, easily the size adapted for hand use. At the same time, the use of four image beams shifted with respect to one another as described above enables highly accurate measurements to be made in the handheld unit. In a presently contemplated embodiment, for example, the unit would be constructed in a generally cylindrical enclosure defining a probe, having a sending end. Cabling for transmitting image data from the probe could exit an opposite end and convey the data to ambulatory or stationary analysis equipment or a workstation. Alternatively, data could be stored in the handheld device, and uploaded to an analysis station after part inspection.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A phase shifting imaging module comprising:
 a first beam splitter configured to split an image radiation beam into first and second image radiation beams;
 a first prism configured to align the first and second image radiation beams;
 a second beam splitter configured to split the first and second image radiation beams into four image radiation beams;
 a second prism configured to align the four image radiation beams;
 a phase mask that receives the four image radiation beams and is configured to introduce a phase retardation between the four image radiation beams resulting in four phase shifted image radiation beams; and
 a pixilated sensor configured to generate image data based upon each of the four phase shifted image radiation beams.

2. The phase shifting imaging module of claim 1, wherein the phase mask is disposed between the second beam splitter and the pixilated sensor.

3. The phase shifting imaging module of claim 1, wherein the first or second beam splitter comprises a prism film.

4. The phase shifting imaging module of claim 1, wherein the first or second beam splitter comprises a prism.

5. The phase shifting imaging module of claim 4, wherein the prism comprises a right angle prism.

6. The phase shifting imaging module of claim 1, wherein the pixilated sensor comprises a charge-coupled device.

7. The phase shifting module of claim 1, wherein the image radiation beam comprises a coherent electromagnetic radiation.

8. The phase shifting module of claim 7, wherein the image radiation beam comprises a spectral range visible to the human eye.

9. The phase shifting module of claim 1, wherein the phase mask comprises at least one quarter wave polarizer.

10. An imaging system comprising:
 at least one radiation source configured to illuminate a part surface to be tested;
 at least one lens configured to collimate a radiation beam;
 at least one polarizer configured to polarize the radiation beam; and
 a phase shifting imaging module configured to split the radiation beam into four aligned radiation beams, and to then phase shift the four aligned radiation beams, the phase shifting imaging module comprising:
 a first beam splitter configured to split an image radiation beam into first and second image radiation beams;
 a first prism configured to align the first and second image radiation beams;
 a second beam splitter configured to split the first and second image radiation beams into four image radiation beams;
 a second prism configured to align the four image radiation beams; and
 a phase mask that receives the four image radiation beams and is configured to introduce a phase retardation between the four image radiation beams resulting in four phase shifted image radiation beams.

11. The imaging system of claim 10, wherein the imaging system comprises a handheld imager.

12. The imaging system of claim 10, further comprising two radiation sources radiating at different wavelengths.

13. The imaging system of claim 10, wherein the at least one radiation source comprises a diode laser.

14. The imaging system of claim 10, wherein the at least one polarizer comprises a quarter wave plate, or a half wave plate.

15. The imaging system of claim 10, wherein the phase shifting imaging module comprises a pixilated sensor to generate an image data based upon each of the four phase shifted image radiation beams.

16. The imaging system of claim 10, wherein the imaging system is coupled to a workstation.

17. A method for measuring a surface feature of a part with a coherent image radiation source, comprising:
 irradiating a surface with a coherent electromagnetic radiation beam;
 receiving an image radiation beam from the surface;
 splitting the image radiation beam into first and second image radiation beams;

aligning the first and second image radiation beams;

splitting the first and the second image radiation beams into four radiation beams;

aligning the four radiation beams;

phase shifting the four radiation beams after alignment; and generating image data via a pixilated sensor.

* * * * *